United States Patent
Okumura et al.

(10) Patent No.: US 10,304,413 B2
(45) Date of Patent: May 28, 2019

(54) DISPLAY CONTROL APPARATUS FOR DISPLAYING INFORMATION RELATING TO PERSONS

(71) Applicant: CASIO COMPUTER CO., LTD., Shibuya-ku, Tokyo (JP)

(72) Inventors: Ryo Okumura, Hamura (JP); Hiroyuki Kato, Hamura (JP); Hiroyoshi Ogawa, Hamura (JP); Shogo Hashimoto, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/617,071

(22) Filed: Jun. 8, 2017

(65) Prior Publication Data
US 2018/0033403 A1 Feb. 1, 2018

(30) Foreign Application Priority Data

Jul. 28, 2016 (JP) .................................. 2016-147935

(51) Int. Cl.
*G09G 5/14* (2006.01)
*G06F 3/0484* (2013.01)
*G06F 3/0488* (2013.01)

(52) U.S. Cl.
CPC .......... *G09G 5/14* (2013.01); *G06F 3/04845* (2013.01); *G06F 3/04883* (2013.01);
(Continued)

(58) Field of Classification Search
CPC ...................................................... G09G 5/14
See application file for complete search history.

(56) References Cited

U.S. PATENT DOCUMENTS

2012/0230596 A1* 9/2012 Watanabe .......... H04N 21/4223
382/232
2013/0041590 A1* 2/2013 Burich ................ G06F 19/3418
702/19
(Continued)

FOREIGN PATENT DOCUMENTS

JP 2008-160879 7/2008
JP 2009-106323 5/2009
(Continued)

OTHER PUBLICATIONS

Japanese Office Action for Japanese Patent Application No. 2016-147935 dated May 15, 2018.
(Continued)

*Primary Examiner* — Ryan R Yang
(74) *Attorney, Agent, or Firm* — Amin, Turocy & Watson LLP

(57) ABSTRACT

A central control unit of a display control apparatus performs control for displaying an image in which one or more persons are included, in a first display area R1, designates a person part of the image to be displayed in the first display area R1, the person part including at least one person therein, according to a manipulation of a user, which is different from directly designating the at least one person, specifies the at least one person included in the designated person part of the image, acquires information relating to the specified at least one person, and performs control for displaying the acquired information relating to the at least one person in a second display area, the second display area being different from the first display area.

16 Claims, 6 Drawing Sheets

(52) U.S. Cl.
CPC .............. *G06F 2203/04808* (2013.01); *G09G 2320/10* (2013.01); *G09G 2340/02* (2013.01); *G09G 2340/045* (2013.01); *G09G 2340/0464* (2013.01); *G09G 2354/00* (2013.01); *G09G 2370/16* (2013.01)

(56) References Cited

U.S. PATENT DOCUMENTS

| | | | | |
|---|---|---|---|---|
| 2013/0082959 A1* | 4/2013 | Shimazu | ............ | G06F 3/04886 345/173 |
| 2015/0185923 A1* | 7/2015 | Yoon | ........................ | G06F 3/044 345/174 |
| 2016/0080907 A1* | 3/2016 | Saleem | ................... | H04W 4/70 455/456.1 |

FOREIGN PATENT DOCUMENTS

| | | |
|---|---|---|
| JP | 2011-49897 | 3/2011 |
| JP | 2014-14683 | 1/2014 |

OTHER PUBLICATIONS

Mahmood, et al, "Automatic player detection and identification for sports entertainment applications", Pattern analysis and applications [online], Springer, Sep. 28, 2014.

Hashimoto, "Complete Conquest from Backup and Encode to Original DVD Creation, DVD & Video Problems Solved!", NetRunner, Japan, Softbank Corporation, vol., 7, No. 5, pp. 70-75, Aug. 30, 2005.

Asada, "Introduction to Tablet and User Guide", Japan, Mainabi Publishing Co., Ltd., 1st Edition, pp. 49 and 76, Jul. 27, 2016.

* cited by examiner

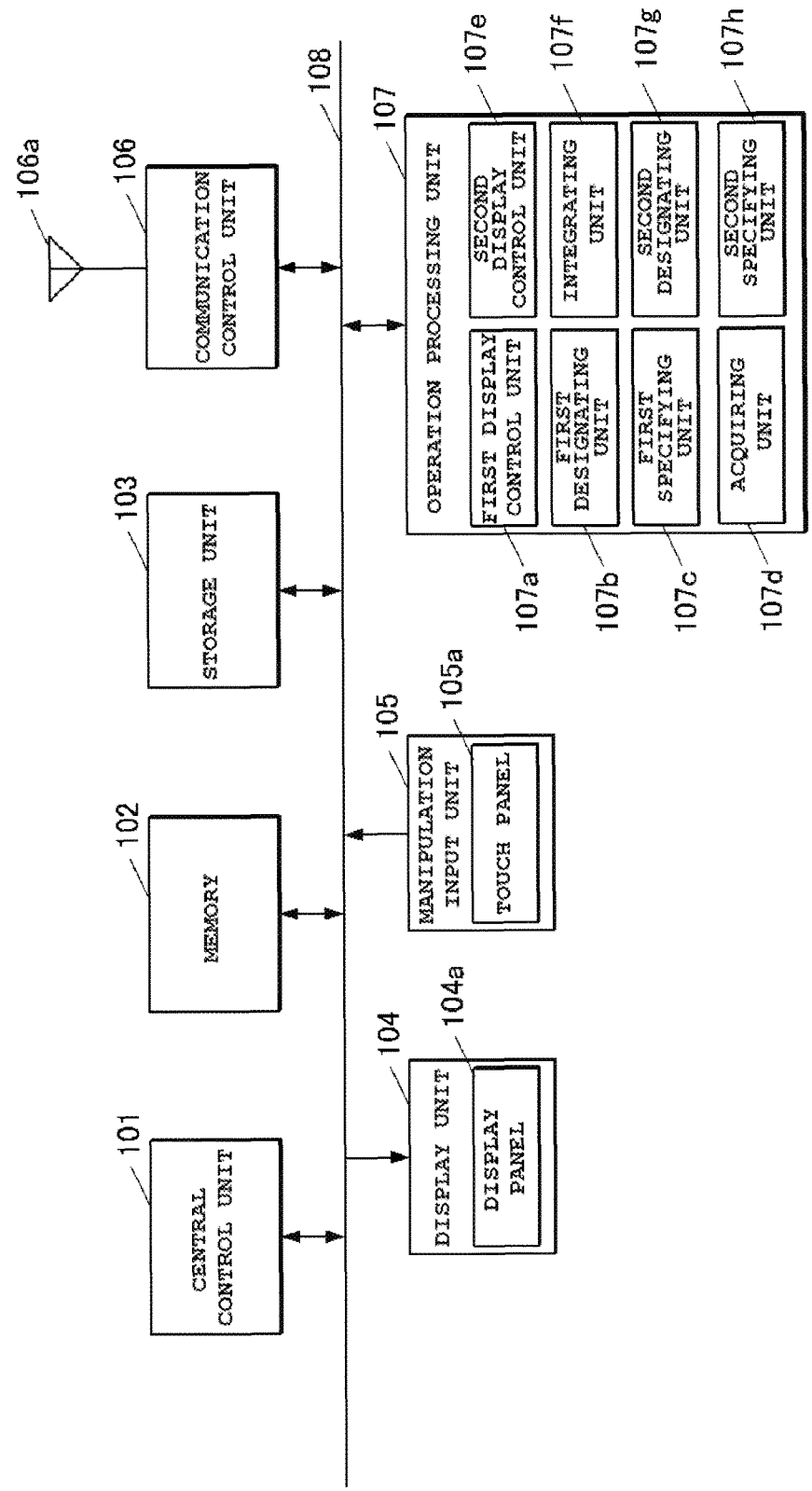

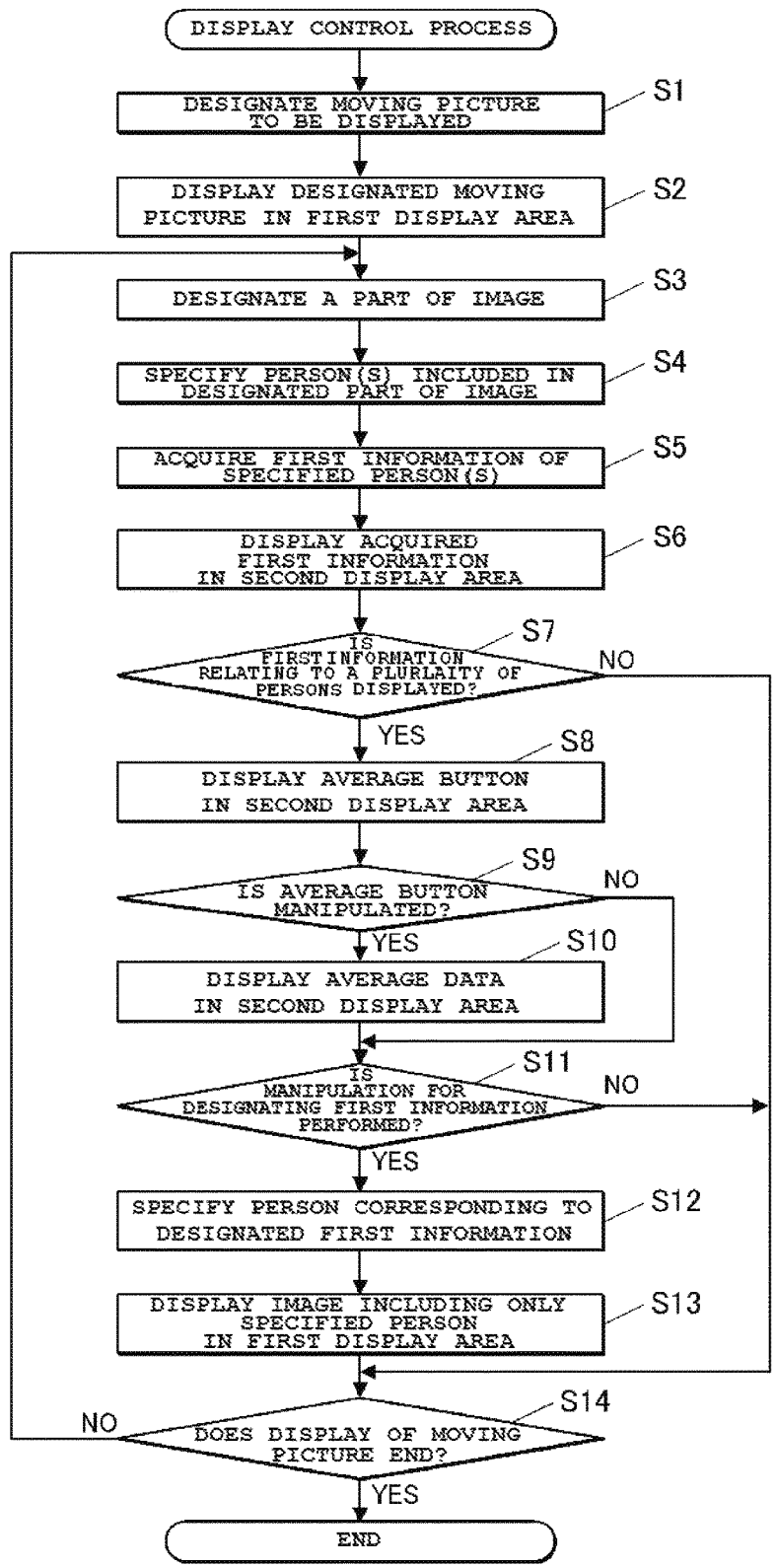

DISPLAY CONTROL APPARATUS FOR DISPLAYING INFORMATION RELATING TO PERSONS

CROSS-REFERENCE TO RELATED APPLICATIONS

This application is based upon and claims the benefit of priority under 35 USC 119 of Japanese Patent Application No. 2016-147935 filed on Jul. 28, 2016, the entire disclosure of which is incorporated herein by reference in its entirety for all purposes.

BACKGROUND OF THE INVENTION

1. Field of the Invention

The present invention relates to a display control apparatus, a display control method, and a computer readable recording medium.

2. Description of the Related Art

Conventionally, an apparatus called a multi-data player is known which synchronizes and displays data relating to individuals engaged in an athletic activity, as disclosed in Japanese Patent Application Laid-Open Publication No. 2014-14683.

SUMMARY OF THE INVENTION

According to an aspect of the present invention, a display control apparatus is provided. The display control apparatus includes a display unit, and a processor that is configured to: perform control for displaying an image in which one or more persons are included, in a first display area of the display unit; designate a person part of the image to be displayed in the first display area, the person part including at least one person therein, according to a manipulation of a user, which is different from directly designating the at least one person; specify the at least one person included in the designated person part of the image; acquire information relating to the specified at least one person; and perform control for displaying the acquired information relating to the at least one person in a second display area of the display unit, the second display area being different from the first display area.

According to another aspect of the present invention, a display control method is provided. The display control method includes performing control for displaying an image in which one or more persons are included, in a first display area; designating a person part of the image to be displayed in the first display area, the person part including at least one person therein, according to a manipulation of a user, which is different from directly designating the at least one person; specifying the at least one person included in the designated person part of the image; acquiring information relating to the specified at least one person; and performing control for displaying the acquired information relating to the at least one person in a second display area, the second display area being different from the first display area.

According to another aspect of the present invention, a non-transitory computer-readable recording medium for recording a program readable by a computer is provided. The program controls the computer to execute functions of: performing control for displaying an image in which one or more persons are included, in a first display area; designating a person part of the image to be displayed in the first display area, the person part including at least one person therein, according to a manipulation of a user, which is different from directly designating the at least one person; specifying the at least one person included in the designated person part of the image; acquiring information relating to the specified at least one person; and performing control for displaying the acquired information relating to the at least one person in a second display area, the second display area being different from the first display area.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings.

Here:

FIG. 1 is a block diagram showing a schematic configuration of a display control apparatus according to an embodiment to which the present invention is applied.

FIG. 3 is a flow chart for showing an example of a display control process performed by the display control apparatus shown in FIG. 1.

DETAILED DESCRIPTION OF THE PREFERRED EMBODIMENT

Figure 2A:
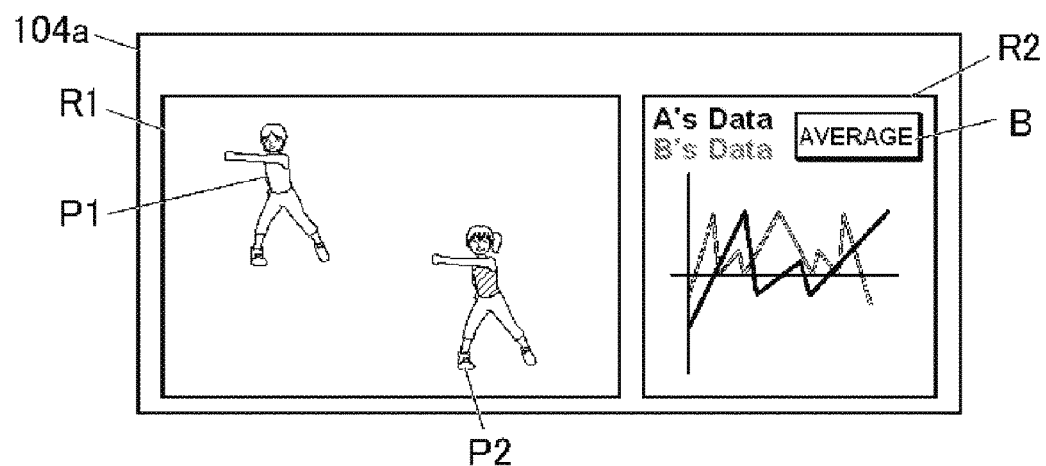
FIG. 2A shows an example of a state in which an original image including a person A and a person B is displayed in a first display area R1 and first information relating to each of the person A and the person B is displayed in a second display area R2, simultaneously.

Hereinafter, embodiments of the present invention will be described with reference to the accompanying drawings. The scope of the invention is not intended to be limited to the illustrated examples.

FIG. 1 is a block diagram showing a schematic configuration of a display control apparatus 1 according to an embodiment to which the present invention is applied.

The display control apparatus 1 according to the present embodiment can be realized by a computer equipped with a touch panel such as a tablet PC. The display control apparatus 1 includes a central control unit 101, a memory 102, a storage unit 103, a display unit 104, a manipulation input unit 105, a communication control unit 106, and an operation processing unit 107.

The central control unit 101, the memory 102, the storage unit 103, the display unit 104, the manipulation input unit 105, the communication control unit 106, and the operation processing unit 107 are connected via a bus line 108 with each other.

The central control unit 101 controls each unit of the display control apparatus 1. More specifically, the central control unit 101 includes a CPU (Central Processing Unit) which is not shown in the drawings, and performs various control operations according to various programs for the display control apparatus 1 (which are not shown in the drawings).

The memory 102 includes, for example, a DRAM (Dynamic Random Access Memory) and temporarily stores data processed by the central control unit 101, the operation processing unit 107, or the like.

The storage unit 103 includes, for example, an SSD (Solid State Drive) and records image data of a still picture or a moving picture encoded according to a predetermined compression format (for example, a JPEG format, an MPEG format, or the like) by an image processing unit (not shown in the drawings) in a file.

In the present embodiment, the storage unit 103 records image data of a moving picture in which a plurality of persons (P1 who is a person A and P2 who is a person B) are doing aerobic dancing as shown in FIG. 2A, for example, in a file. Further, the storage unit 103 records information relating to each of the plurality of persons included in the moving picture (P1 who is the person A and P2 who is the person B) in a file different from the file in which the image data of the moving picture is recorded so that the information can be synchronized with playback time of the moving picture. Here, information relating to a person included in the moving picture means information sequentially acquired by one or more sensors (such as an acceleration sensor, a heart rate sensor, a (body) temperature sensor, or a GPS) included in a sensor apparatus (which is different from the display control apparatus 1) carried or worn by the person. The information relating to a person included in the moving picture is divided into first information and second information. The first information is displayed in a second display area R2 of a display panel 104a which will be described later. Further, the first information is information relating to an athletic activity which is acquired by the acceleration sensor, the heart rate sensor, the temperature sensor, or the like. The second information is information indicating position coordinates (for example, pixel coordinates) of each of a plurality of persons in a frame image included in the moving picture. Further, the second information is acquired by using information acquired by the GPS, the acceleration sensor, or the like, of the sensor apparatus carried or worn by each of the plurality of persons included in the moving picture and information relating to an imaging angle of view at the time of taking the moving picture.

The storage unit 103 may include a removable recording medium (not shown in the drawings), for example, and control reading/writing data from/to the recording medium.

The display unit 104 displays an image or the like in a display area of the display panel 104a.

More specifically, the display unit 104 displays a moving picture or a still picture based on image data of a predetermined size decoded by the image processing unit (not shown in the drawings) in the display area of the display panel 104a.

In the present embodiment, for example, the display unit 104 displays the moving picture in which the plurality of persons (P1 who is the person A and P2 who is the person B) are doing aerobic dancing in a display area R1 of the display panel 104a and the first information (A's Data and B's Data) relating to each of the persons included in the moving picture (P1 who is the person A and P2 who is the person B) in the second display area R2 of the display panel 104a, as shown in FIG. 2A.

For example, the display panel 104a may include a liquid crystal display (LCD) panel, an organic EL (Electro-Luminescence) display panel, or the like, without limitation.

The manipulation input unit 105 is provided for a predetermined manipulation of the display control unit 1. More specifically, the manipulation input unit 105 includes a power button for power ON/OFF manipulations, a button for instruction of selection of one of various modes or functions, or the like (all not shown in the drawings).

In the case that a user manipulates a button, the manipulation input unit 105 outputs a manipulation instruction according to the manipulated button to the central control unit 101. The central control unit 101 controls each unit to execute a predetermined operation (for example, playback of the moving picture) according to the manipulation instruction output from the manipulation input unit 105.

The manipulation input unit 105 includes a touch panel 105a provided integrally with the display panel 104a of the display unit 104.

The touch panel 105a detects a contact position of the user's finger (or hand), a touch pen, or the like, which directly or indirectly contacts with a display screen forming a display area of the display panel 104a. The touch panel 105a is provided on the display screen of the display panel 104a or under the display screen, for example, and detects the XY coordinates of the contact position on the display screen at a predetermined sampling period by one of various methods such as an electrostatic capacity method, a resistance film method, and an ultrasonic surface acoustic wave method. The touch panel 105a outputs a position signal relating to the XY coordinates of the contact position to the operation processing unit 107.

The communication control unit 106 receives and transmits data via a communication antenna 106a and a communication network.

More specifically, the communication antenna 106a is capable of data transmission and reception corresponding to a predetermined communication standard (for example, W-CDMA (Wideband Code Division Multiple Access), CDMA 2000, or GSM (Global System for Mobile Communications; Registered Trademark) adopted by the display control apparatus 1 in communication with a wireless base station (not shown in the drawing). According to a communication protocol corresponding to the predetermined communication standard, the communication control unit 106 receives/transmits data from/to the wireless base station via the communication antenna 106a by a communication channel set according to the communication standard.

The communication network is a network in which the display control apparatus 1 is connected with an external device, for example, via the wireless base station or a gateway server (not shown in the drawings). The communication network is established using a dedicated line or an existing general public line. One of various types of line such as WAN (Wide Area Network) and LAN (Local Area Network) can be applied to the communication network.

The configuration of the communication control unit 106 described above is an example. The communication control unit 106 of the present invention is not limited to the configuration and can be modified properly as necessary. For example, the communication control unit 106 may be provided with a wireless LAN module or a Bluetooth (Registered Trademark) module (not shown in the drawings).

The wireless LAN module may be accessible to the communication network via an access point (not shown in the drawings) or operate in a peer-to-peer (Ad-hoc) mode to establish a wireless communication line with the external device directly without passing through the access point. Further, the Bluetooth module may perform wireless communication with the external device using a synchronized communication scheme based on the Bluetooth communication specification.

The operation processing unit 107 includes a first display control unit 107a, a first designating unit 107b, a first specifying unit 107c, an acquiring unit 107d, a second display control unit 107e, an integrating unit 107f, a second designating unit 107g, and a second specifying unit 107h.

Further, each unit of the operation processing unit 107 includes a predetermined logic circuit, for example. The present invention is not limited to this.

The first display control unit 107a performs control for displaying a moving picture in the first display area R1 of the display panel 104a.

In other words, the first display control unit (a first display control means) 107a performs control for displaying an image (the moving picture) including the plurality of persons in the first display area R1 of the display panel 104a.

More specifically, in the case that image data of a moving picture in which a plurality of desired persons are included is designated based on a manipulation of the manipulation input unit 105 by the user, the first display control unit 107a performs control for displaying the moving picture including the plurality of desired persons (see FIG. 2A) in the first display area R1 of the display panel 104a.

Further, the first display control unit 107a can enlarge or reduce the size of an image (or a frame image) displayed in the first display area R1 based on a so-called pinch manipulation of the user on the touch panel 105a. Here, the pinch manipulation means a gesture of picking with two fingers (for example, a thumb and a forefinger). More specifically, the pinch manipulation is classified into a pinch-out manipulation of widening the space between two fingers pressing the touch panel 105a to enlarge the space and a pinch-in manipulation of narrowing the space between two fingers pressing the touch panel 105a to reduce the space.

In the present embodiment, the first display control unit 107a can perform control for reducing an original image displayed in the first display area R1 to a size smaller than the size of the original image and displaying the reduced image based on the so-called pinch-in manipulation by the user on the touch panel 105a, for example, unlike general display control for enlargement and reduction. In this case, the first display control unit 107a performs control for displaying of an image of one color (such as white, block, or blue) in a blank space outside the area in which the reduced image is being displayed.

Further, the first display control unit 107a can scroll the image (the frame image) displayed in the first display area R1 based on the so-called swipe manipulation by the user on the touch panel 105a. Here, the swipe manipulation means a gesture of sliding a finger while the finger is contacting with the touch panel 105a.

In the present embodiment, the first display control unit 107a can perform control for scrolling the original image displayed in the first display area R1 so that the whole of the image is not placed outside the display area based on the so-called swipe manipulation by the user on the touch panel 105a, for example, unlike general display control for scroll.

In this case, as well, the first display control unit 107a performs control for displaying of an image of one color (such as white, block, or blue) in a blank space outside the area in which the image is being displayed.

The first designating unit 107b designates a person included in the image (the frame image included in the moving picture) which is being displayed in the first display area R1 of the display panel 104a.

The first designating unit (a first designating means) 107b designates a person included in the image which is being displayed in the first display area R1 by designating a part of the image in which the person is included by a user manipulation different from a user manipulation for directly designating the person.

Figure 2B:
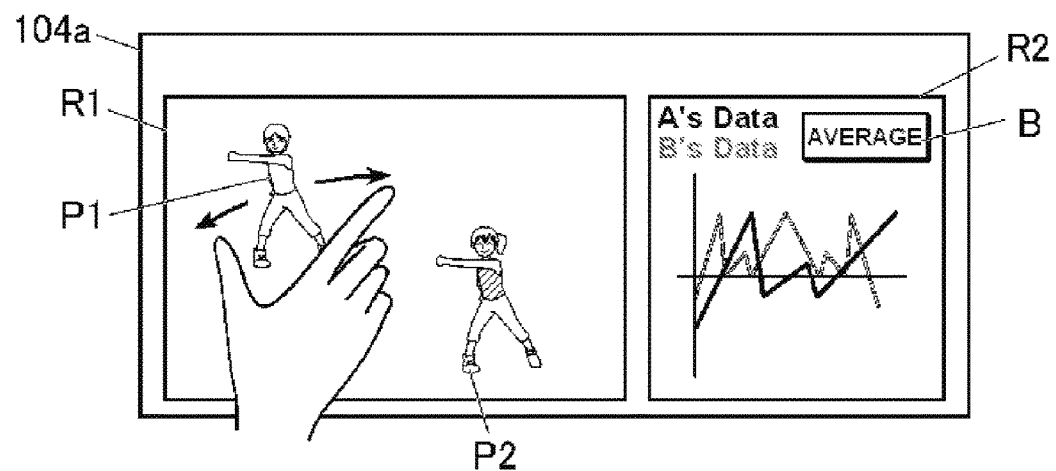
FIG. 2B is a drawing for explanation of a pinch manipulation of a user on a touch panel in the case of designating a part of the image in which the person A is included.
Figure 2C:
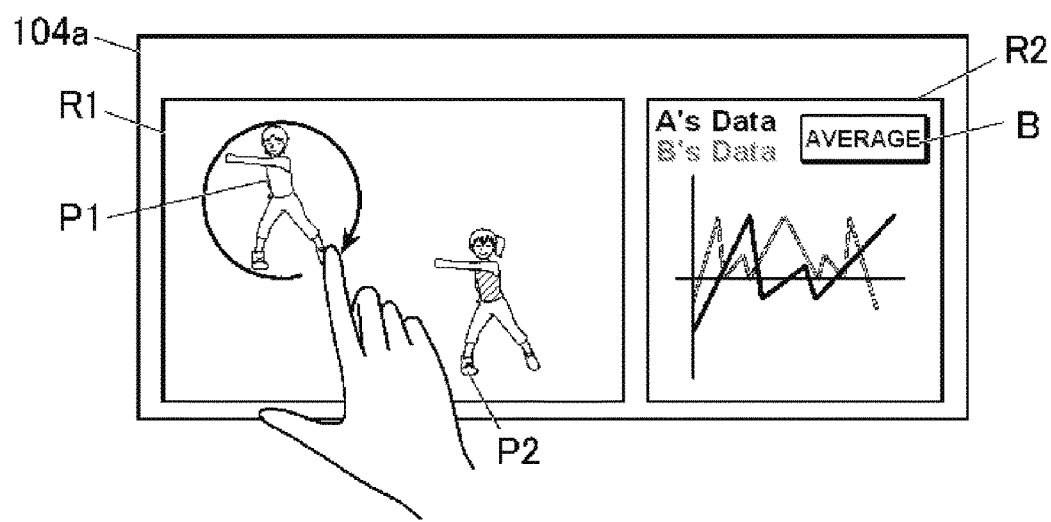
FIG. 2C is a drawing for explanation of a swipe manipulation of the user on the touch panel in the case of designating a part of the image in which the person A is included.
Figure 2D:
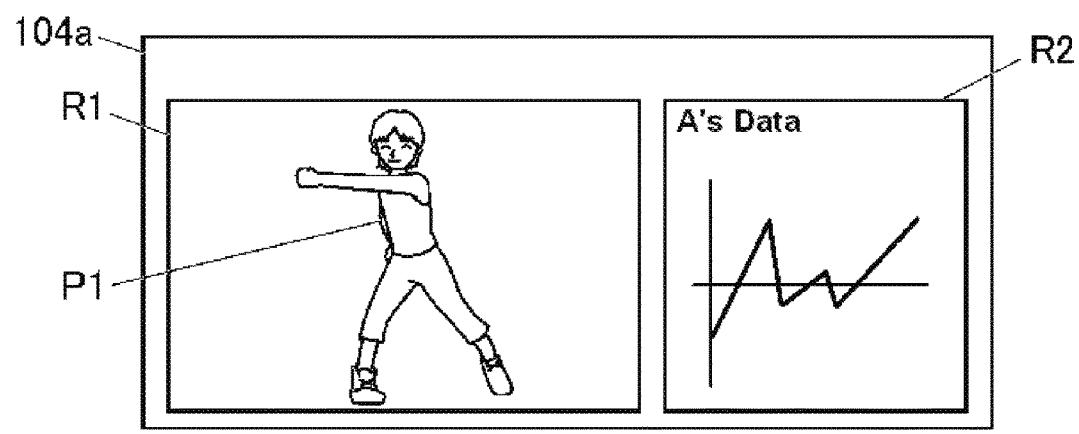
FIG. 2D shows an example of a state in which a part of the original image including only the person A is displayed in the first display area R1 and the first information relating to the person A is displayed in the second display area R2, simultaneously.

More specifically, the first designating unit 107b designates a part of the image in which P1 who is the person A is included by enlarging and displaying P1 who is the person A displayed on the left side of the first display area R1, for example, based on the so-called pinch-out manipulation by the user on the touch panel 105a, as shown in FIG. 2B, and scrolling the image based on the so-called swipe manipulation by the user on the touch panel 105a (not shown in the drawings) so that P1 who is the person A is positioned at the center of the first display area R1 as shown in FIG. 2D. By this, the first designating unit 107b designates the person included in the image which is being displayed in the first display area R1.

Further, the display control apparatus 1 may be switchable to a blending mode based on a so-called touch-hold manipulation (or a long-press manipulation) by the user on the touch panel 105a, for example, and the first designating unit 107b may designate a part of the image in which P1 who is the person A is included based on the so-called swipe manipulation by the user on the touch panel 105a, as shown in FIG. 2C, in the blending mode, by a closed space formed by a trajectory of the swipe manipulation. This makes it easy to designate a part of the image including the person in whom the user is interested.

Furthermore, the number of persons included in a part of the image designated by the first designating unit 107b based on the user's manipulation is not limited to one (1). A part of the image including a plurality of persons can also be designated.

The first specifying unit 107c specifies a person included in the part of the image (the frame image included in the moving picture) designated by the first designating unit 107b.

In other words, the first specifying unit (a first specifying means) 107c sequentially specifies a person included in the part of the image designated by the first designating unit 107b while the moving picture is being displayed.

More specifically, every time the frame image is changed, the first specifying unit 107c reads the second information relating to each of the plurality of persons (P1 who is the person A and P2 who is the person B) at the time at which the frame image is displayed (i.e. playback time), that is, information indicating position coordinates (for example, pixel coordinates) of each of the plurality of persons from the storage unit 103. For example, the information indicating position coordinates of each of the plurality of persons is coordinates of the center of the person's face. The first specifying unit 107c determines whether or not a predetermined area around the position coordinates of each of the plurality of persons (P1 who is the person A and P2 who is the person B) (for example, an area set at least so that no part of the face is cut) is included in the part of the image designated by the first designating unit 107b. Then, the first specifying unit 107c specifies the person corresponding to the position coordinates determined to be included in the part of the image designated by the first designating unit 107b.

In addition, in the case that a plurality of persons are included in the part of the image designated by the first designating unit 107b, the first specifying unit 107c specifies each of the plurality of persons.

The acquiring unit (an acquiring means) 107d acquires information relating to the person(s) sequentially specified by the first specifying unit 107c.

More specifically, the acquiring unit 107d acquires the first information of the person sequentially specified by the first specifying unit 107c, that is, information to be displayed in the second display area R2 of the display panel 104a (the information on the athletic activity) from the storage unit 103. Further, in the case that a plurality of persons are sequentially specified by the first specifying unit 107c, the acquiring unit 107d acquires the first information of each of the plurality of persons from the storage unit 103.

The second display control unit 107e performs control for displaying the first information (for example, the information on the athletic activity) in the second display area R2 of the display panel 104a.

In other words, the second display control unit (a second display control means) 107e performs control for displaying the first information acquired by the acquiring unit 107d in the second display area R2 of the display panel 104a which is different from the first display area R1.

More specifically, for example, in the case that the first specifying unit 107c specifies that the person included in the image (for example, the frame image included in the moving picture) which is being displayed in the first display area R1 is P1 who is the person A as shown in FIG. 2D and the acquiring unit 107d acquires the first information of P1 who is the person A, the second display control unit 107e performs control for displaying the first information of P1 who is the person A ("A' Data") in the second display area R2. Further, in the case that the first specifying unit 107c specifies that a plurality of persons, P1 who is the person A and P2 who is the person B, are included in the image (for example, the frame image included in the moving picture) which is being displayed in the first display area R1 as shown in FIG. 2A and the acquiring unit 107d acquires the first information of each of P1 who is the person A and P2 who is the person B, the second display control unit 107e performs control for displaying the first information of P1 who is the person A ("A' Data") and the first information of P2 who is the person B ("B' Data") in the second display area R2 such that A' Data and B's Data can be distinguished from each other.

Further, in the case that the first information of each of the plurality of persons is displayed in the second display area R2, the second display control unit 107e performs control for displaying an "AVERAGE" button B, which will be described later, with the first information.

The integrating unit (an integrating means) 107f performs processing for integrating the first information of each of the plurality of persons (for example, the information on the athletic activity) as one piece of information.

More specifically, in the case that the user manipulates the "AVERAGE" button B displayed in the second display area R2 (for example, the user touches the button B) as shown in FIGS. 2A to 2C, the integrating unit 107f acquires average data (not shown in the drawings) by calculating an average of A's Data showing acceleration data of P1 who is the person A and B' Data showing acceleration data of P2 who is the person B, for example. Then, the second display control unit 107e performs control for displaying the average data acquired by the integrating unit 107f in the second display area R2. The "AVERAGE" button B is a toggle button. In the case that the user manipulates the "AVERAGE" button B (for example, the user touches the button B) when the average is being displayed in the second display area R2, the second display control unit 107e performs control such that the display mode of the second display area R2 returns to the original display mode, i.e., the state where A' Data of P1 who is the person A and B' Data of P2 who is the person B are displayed in the second display area R2.

The second designating unit 107g designates the first information of one or more persons in whom the user is interested.

In other words, in the case that the first information of each of a plurality of persons is displayed distinguishably from each other in the second display area R2 of the display panel 104a, the second designating unit (a second designating means) 107g designates the first information of one or more of the plurality of persons.

More specifically, in the case that the user manipulates the characters of "A's Data" or "B's Data" displayed in the upper part of the second display area R2 (for example, the user touches the characters) as shown in FIG. 2A, for example, the second designating unit 107g designates the first information of the person corresponding to the characters manipulated by the user (P1 who is the person A or P2 who is the person B).

The second specifying unit 107h specifies the one or more person corresponding to the first information designated by the second designating unit 107g.

In other words, in the case that the first information relating to each of the plurality of persons is displayed distinguishably from each other in the second display area R2 of the display panel 104a and the first information of one or more persons of the plurality of persons is designated by the second designating unit 107g, the second specifying unit (a second specifying means) 107h specifies the one or more persons corresponding to the designated first information.

More specifically, in the case that the characters of "A's Data" and "B' Data" are displayed in the upper part of the second display area R2 as shown in FIG. 2A and, for example, the user manipulates the characters of "A's Data" (for example, the user touches the characters), that is, the first information relating to P1 who is the person A (i.e. A' Data) is designated by the second designating unit 107g, the second specifying unit 107h specifies the person corresponding to the designated first information (A's Data) as P1 who is the person A.

Then, in the case that the person corresponding to the first information designated by the second designating unit 107g is specified by the second specifying unit 107h, the first display control unit 107a performs control for displaying an image including only the person in the first display area R1 of the display panel 104a.

More specifically, for example, in the case that the person is specified as P1 who is the person A by the second specifying unit 107h, the first display control unit 107a sequentially reads the second information, i.e. information indicating position coordinates (for example, pixel coordinates) relating to each of the plurality of persons included in the original image of the image displayed in the first display area R1 of the display panel 104a (P1 who is the person A and P2 who is the person B) from the storage unit 103. Each time the information indicating the position coordinates (for example, the pixel coordinates) is read, the first display control unit 107a changes the size and the display position of a part of an original image to be displayed such that only the position coordinates of P1 who is the person A are included in the first display area R1 and the position coordinates of P2 who is the person B are not included in the first display area R1 in order to display an image (a part of the original image) in which only P1 who is the person A is included in the first display area R1.

In the following, a display control process performed by the display control apparatus 1 according to the embodiment will be described. FIG. 3 is a flow chart for showing an example of the display control process.

As shown in FIG. 3, image data of a moving picture to be displayed is designated from moving pictures recorded in the storage unit 103 based on a predetermined manipulation of the manipulation input unit 105 by the user (Step S1). Then, the first display control unit 107a reads the image data of the designated moving picture from the storage unit 103 and performs control for displaying a plurality of frame images forming the moving picture decoded by the image processing unit (not shown in the drawings) at a predetermined frame rate (for example, 30 fps) in the first display area R1 of the display panel 104a (see FIG. 2A) (Step S2).

Then, the first designating unit 107b designates a part in which one or more persons are included of an image (i.e. the frame image) displayed in the first display area R1 based on the manipulation of the user (for example, the pinch manipulation, the swipe manipulation, or the like) on the touch panel 105a (Step S3). In the case that the predetermined manipulation on the touch panel 105a is not performed by the user, the first designating unit 107b designates the part of the image which is being displayed in the first display area R1 at this time. In other words, in the beginning the moving picture is displayed in the first display area R1, the first designating unit 107b designates the entire range of the frame image included in the moving picture, i.e. the whole of the original image, unless the user performs a predetermined manipulation on the touch panel 105a.

The first specifying unit 107c specifies the one or more persons included in the part of the image designated by the first designating unit 107b (Step S4). Then, the acquiring unit 107d acquires the first information (for example, information relating to an athletic activity) of the one or more persons specified by the first specifying unit 107c from the storage unit 103 (Step S5). The second display control unit 107e performs control for displaying the first information acquired by the acquiring unit 107d in the second display area R2 in the display panel 104a (Step S6).

More specifically, for example, in the case that a part of the image (for example, the frame image) displayed in the first display area R1 in which P1 who is the person A is included is designated based on a predetermined manipulation by the user on the touch panel 105a as shown in FIG. 2D, the first specifying unit 107c specifies the person included in the part of the image as P1 who is the person A (Step S4). Then, the acquiring unit 107d acquires the first information of P1 who is the person A specified by the first specifying unit 107c (A's Data) from the storage unit 103 (Step S5). The second display control unit 107e performs control for displaying the first information (A's Data) acquired by the acquiring unit 107d in the second display area R2 of the display panel 104a (Step S6).

Then, the central control unit 101 determines whether or not the first information relating to each of a plurality of persons is displayed in the second display area R2 (Step S7).

In the case that it is not determined at Step S7 that the first information relating to each of the plurality of persons is displayed in the second display area R2, i.e. it is determined that the first information relating to only one person is displayed in the second display area R2 (Step S7: NO), the process proceeds to Step S14.

On the other hand, it is determined at Step S7 that the first information relating to each of the plurality of persons is displayed in the second display area R2 (Step S7: YES), the second display control unit 107e performs control for displaying the "AVERAGE" button B in the second display area R2 (Step S8).

Then, the integrating unit 107f determines whether or not a touch manipulation of the "AVERAGE" button B is performed (Step S9).

In the case that it is determined at Step S9 that the touch manipulation of the "AVERAGE" button B is performed (Step S9: YES), the integrating unit 107f acquires average data by calculating an average of the first information of each of the plurality of persons (for example, A's Data showing acceleration data of P1 who is the person A and B' Data showing acceleration data of P2 who is the person B). Then, the second display control unit 107e performs control for displaying the average data acquired by the integrating unit 107f in the second display area R2 (Step S10) and the process proceeds to Step S11.

On the other hand, in the case that it is determined at Step S9 that no touch manipulation of the "AVERAGE" button B is performed (Step S9: NO), the process skips Step S10 and proceeds to Step S11.

Then, the second designating unit 107g determines whether or not the user performs a touch manipulation to designate one of the plurality of pieces of the first information each of which relates to each of the plurality of persons displayed in the second display area R2 of the display panel 104a (Step S11).

In the case that it is determined at Step S11 that no touch manipulation is performed to designate one of the plurality of pieces of the first information (Step S11: NO), the process proceeds to Step S14.

On the other hand, in the case that it is determined at Step S11 that the touch manipulation is performed to designate one of the plurality of pieces of the first information (Step S11: YES), the second specifying unit 107h specifies a person corresponding to the one piece of the first information designated by the second designating unit 107g (Step S12).

More specifically, in the case that the characters of "A's Data" and "B's Data" are displayed in the upper part of the second display area R2 as shown in FIG. 2A, and, for example, the user touches the characters of "A's Data" (Step S11: YES), i.e. the first information relating to P1 who is the person A (A's Data) is designated by the second designating unit 107g, the second specifying unit 107h specifies the person corresponding to the first information (A's Data) as P1 who is the person A.

Then, the first display control unit 107a performs control for displaying an image in which only the person specified by the second specifying unit 107h is included in the first display area R1 of the display panel 104a (Step S13).

The operation processing unit 107 determines whether or not display of the moving picture ends (Step S14). Here, there are two type of ending of display of the moving picture, i.e. one type of ending due to completion of playback of the moving picture and the other type of ending based on a predetermined manipulation of the manipulation input unit 105 by the user.

It is determined at Step S14 that display of the moving picture does not end (Step S14: NO), the process proceeds to Step S3 and repeats the following steps.

On the other hand, it is determined at Step S14 that display of the moving picture ends (Step S14: YES), the display control process ends.

As described above, the display control apparatus 1 according to the embodiment performs control for displaying an image in which the persons (P1 who is the person A, P2 who is the person B) are included in the first display area R1 of the display panel 104a. Further, the display control apparatus 1 designates a part of the image including a person to be displayed in the first display area R1 by a manipulation by the user which is different from the user manipulation for directly designating the person and specifies the person included in the designated part of the image. Further, the display control apparatus 1 acquires information relating to the specified person (the first information) and performs control for displaying the acquired information in the second display area R2 which is different from the first display area R1.

Thus, by designating a part of the image including a person in whom the user is interested in the first display area R1, the display control apparatus 1 according to the embodiment can allow information relating to the person (the first information) to be displayed in the second display area R2. Therefore, it is possible to easily display only the information relating to the person in whom the user is interested. Further, since only the person corresponding to the information displayed in the second display area R2 is included in the first display area R1, correspondence between the person and information relating to the person can be easily recognized.

Further, the display control apparatus 1 according to the embodiment performs control for displaying a part of the original image in which a person is included as an image including the person in the first display area R1 and, by a manipulation by the user for changing a part of the original image to be displayed in the first display area R1, designates the part to be displayed in the first display area R1. Thus, it is easy to designate the part of the image including the person in whom the user is interested and display only the information relating to the person (the first information).

According to the display control apparatus 1 according to the embodiment, a part of the original image to be displayed in the first display area R1 is designated by the pinch manipulation for changing the size of the part of the original image to be displayed in the first display area R1 or the swipe manipulation for changing the position of the part of the original image. Thus, it is possible to improve operability associated with designation of the part of the image and display only the information (the first information) relating to the person in whom the user is interested more easily.

According to the display control apparatus 1 according to the embodiment, the part of the image to be displayed in the first display area R1 is designated by the swipe manipulation in the blending mode. Thus, it is possible to improve operability associated with designation of the part of the image and display only the information (the first information) relating to the person in whom the user is interested more easily.

Further, the display control apparatus 1 according to the embodiment acquires the information (the first information) relating to each of a plurality of persons is acquired in the case that the plurality of persons are specified in the first display area R1 and performs control for displaying the information relating to each of the plurality of persons distinguishably from each other in the second display area R2. Thus, in the case that the user is interested in a plurality of persons, it is possible to reduce the burden of designating each of parts of the image in which the plurality of persons are included.

Further, in the case that a plurality of persons are specified in the first display area R1, the display control apparatus 1 according to the embodiment acquires the information (the first information) relating to each of the plurality of persons, performs processing for integrating the information relating to each of the plurality of persons as one piece of information, and performs control for displaying the one piece of integrated information in the second display area R2. Thus, in the case that the user is interested in the plurality of persons, it is possible to improve usability of the information (the first information) relating to the plurality of persons.

Further, the display control apparatus 1 according to the embodiment performs control for displaying a moving picture as images in which one or more persons are included in the first display area R1. Then, the display control apparatus 1 sequentially specifies one or more persons included in a part of the moving picture in the first display area R1. The display control apparatus 1 sequentially acquires the information (the first information) relating to the specified person(s) and performs control for sequentially displaying the information relating to the person(s) in the second display area R2.

Thus, by designating a part of an image included in a moving picture, which includes one or more persons in whom the user is interested, displayed in the first display area R1 one time, the information (the first information) relating to the one or more persons can be displayed sequentially in the second display area R2 while the moving picture is displayed. Therefore, only the information (the first information) relating to the person(s) in whom the user is interested can be displayed easily.

In the case that the information (the first information) relating to each of the plurality of persons is displayed distinguishably from each other in the second display area R2, the display control apparatus 1 according to the embodiment designates the information relating to one or more of the persons and specifies the one or more persons corresponding to the designated information. Further, the display control apparatus 1 according to the embodiment performs control for displaying an image including only the specified person(s) in the first display area R1.

Thus, by designating the information relating the person(s) in whom the use is interested in the second display area R2, a part of the original image including the person(s) can also be designated.

In addition, the present invention is not limited to the embodiments described above and various modification or design changes of the embodiments can be made without departing from the scope and spirit of the invention.

For example, in the embodiments described above, the information (the first and the second information) relating to each of the plurality of persons included in the moving picture is recorded in the file different from the file in which the moving picture is recorded. However, the present invention is not limited to these embodiments. For example, the information relating to each of the plurality of persons included in the moving picture may be recorded in the file in which the moving picture is recorded.

In the embodiments described above, a moving picture including person(s) is displayed in the first display area R1 of the display panel 104a. However, the present invention is not limited to these embodiments. For example, a still picture including person(s) may be displayed in the first display area R1. In the case that the image data is the moving picture as in the above embodiments, it is effective to display dynamic information such as information relating to the athletic activity as the information relating to the person(s). On the other hand, in the case that the image data is the still picture, static information relating to each of the person(S) may be displayed as the information relating to the person(s).

The embodiments have been described with respect to the example in which the display control process is performed on the image data of the moving picture including the person(s) and the information relating to each of the person(s) included in the moving picture previously acquired. However, in another embodiment, the display control process is executed in real time or almost in real time while sequentially acquiring image data of a moving picture from an imaging apparatus and sequentially acquiring information relating to each of a plurality of persons included in the moving picture from the sensor apparatus.

The embodiments have been described with respect to the examples in which the pinch manipulation and the swipe manipulation on the touch panel 105 are used as the user manipulation to designate a part of the image including the person in whom the user is interested. However, the user manipulation is not limited to the pinch manipulation and the swipe manipulation if it can be used to designate the part of the image. The user manipulation for designating the part of the image is not limited to the predetermined manipulations on the touch panel 105. For example, the user manipulation may be a predetermined manipulation of a hardware key provided in the manipulation input unit 105 (for example, a push manipulation).

The embodiments have been described with respect to the example in which the first specifying unit 107c specifies the person included in the designated part of the image based on the second information relating to each of the plurality of persons, i.e. the information indicating the position coordinates (for example, the pixel coordinates) of each of the plurality of persons. However, the present invention is not limited to the embodiments. For example, the person included in the designated part of the image may be specified using conventional face recognition processing.

The embodiments have been described with respect to the example in which the integrating unit 107f acquires the average data by calculating the average of A's Data showing the acceleration data of P1 who is the person A and B's Data showing the acceleration data of P2 who is the person B. However, the present invention is not limited to the embodiments. For example, the integrating unit 107f may acquire sum data by calculating the sum of A's Data of the person A and B's Data of the person B, or the like.

Further, the embodiments have been described with respect to the example in which the touch manipulation on the touch panel 105a for designating the characters of "A's Data" or "B's Data" is used as the user manipulation to designate the information (the first information) relating to the person in whom the user is interested. However, the present invention is not limited to the embodiments. In another embodiment, the user manipulation is a touch manipulation for touching directly the information (the first information) relating to the person in whom the user is interested, and the type of the touch manipulation is not limited if the information (the first information) relating to the person in whom the user is interested can be designated by the touch manipulation. Further, the user manipulation for designating the information (the first information) relating to the person in whom the user is interested is not limited to the predetermined manipulation on the touch panel 105. For example, the user manipulation may be a predetermined manipulation of a hardware key provided in the manipulation input unit 105 (for example, a push manipulation).

Furthermore, the embodiments have been described with respect to the example in which the first display area R1 and the second display area R2 are disposed in one display panel 104a. However, the present invention is not limited to the embodiments. For example, the display control apparatus 1 may include two display panels and each of the first display area R1 and the second display area R2 may be disposed in a different one of the two display panels.

According to the embodiments described above, the functions of the first display control means, the first designating means, the first specifying means, the acquiring means, and the second display control means are realized by driving the first display control unit, the first designating unit, the first specifying unit, the acquiring unit, and the second display control unit, respectively, under the control of the central control unit 101. However, the present invention is not limited to the above and the functions may be realized by executing a predetermined program by the CPU of the central control unit 101.

In other words, a program including a first display control processing routine, a first designating processing routine, a first specifying processing routine, an acquiring processing routine, and a second display control processing routine is stored in a program memory (not shown in the drawings). The CPU of the central control unit 101 can function as a means for executing processing for performing control for displaying the image including person(s) in the first display area according to the first display control processing routine. The CPU of the central control unit 101 can function as a means for executing processing for designating a part of the image displayed in the first display area in which a person is included by the manipulation by the user different from the user manipulation for designating the person directly according to the first designating processing routine. The CPU of the central control unit 101 can function as a means for executing processing for specifying the person included in the part of the image designated by the first designating processing routine according to the first specifying processing routine. The CPU of the central control unit 101 can function as a means for executing processing for acquiring the information relating to the person specified by the first specifying processing routine according to the acquiring processing routine. The CPU of the central control unit 101 can function as a means for executing processing for performing control for displaying the information relating to the person acquired by the acquiring processing routine in the second display area different from the first display area according to the second display control processing routine.

In addition, a computer readable recording medium for recording the program for executing the respective processing can be a ROM, a hard disk, a non-volatile memory such as a flash memory, a portable recording medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A display control apparatus comprising:
a display unit; and
a processor that is configured to:
   perform control for displaying a moving picture in which one or more persons are included, in a first display area of the display unit;
   designate a person part of the moving picture to be displayed in the first display area, the person part including at least one person therein, according to a manipulation performed by a user in relation to the first display area for designating the at least one person;
   sequentially specify the at least one person included in the designated person part of the moving picture;
   sequentially acquire information relating to the at least one person sequentially specified; and
   perform control for sequentially displaying the information relating to the at least one person sequentially acquired in a second display area of the display unit, the second display area being different from the first display area.

2. The display control apparatus of claim 1, wherein the processor is configured to designate the person part to be displayed in the first display area according to a manipulation of the user for designating at least a part of the moving picture displayed in the first display area.

3. The display control apparatus of claim 1, wherein, in the case that a plurality of persons are specified in the designated person part, the processor is configured to acquire information relating to each of the plurality of persons, and
   perform control for displaying the acquired information relating to each of the plurality of persons distinguishably from each other in the second display area.

4. The display control apparatus of claim 3, wherein the processor is further configured to:
   designate the information relating to one or more persons among the information relating to each of the plurality of persons displayed distinguishably from each other in the second display area;
   specify the one or more persons corresponding to the designated information; and
   perform control for displaying an image in which only the specified one or more persons are included in the first display area.

5. The display control apparatus of claim 1, wherein, in the case that a plurality of persons are specified in the designated person part, the processor is configured to acquire information relating to each of the plurality of persons, and the processor is further configured to: perform processing to integrate the information relating to each of the plurality of persons as one piece of information; and perform control for displaying the one piece of integrated information in the second display area.

6. A display control apparatus comprising:
a display unit; and
a processor that is configured to:
   perform control for displaying at least a part of an original image in a first display area of the display unit, one or more persons being included in the at least a part of the original image,
   designate a person part of the original image to be displayed in the first display area, the person part including at least one person therein, according to a manipulation of a user for changing a part of the original image displayed in the first display area,
   specify the at least one person included in the designated person part,
   acquire information relating to the specified at least one person, and
   perform control for displaying the acquired information relating to the at least one person in a second display area of the display unit, the second display area being different from the first display area.

7. The display control apparatus of claim 6, wherein the processor is configured to designate the person part to be displayed in the first display area according to a manipulation of the user for changing the size or the position of the part of the original image displayed in the first display area.

8. A display control method comprising:
   performing control for displaying a moving picture in which one or more persons are included, in a first display area;
   designating a person part of the moving picture to be displayed in the first display area, the person part including at least one person therein, according to a manipulation performed by a user in relation to the first display area for designating the at least one person;
   sequentially specifying the at least one person included in the designated person part of the moving picture;
   sequentially acquiring information relating to the at least one person sequentially specified; and
   performing control for sequentially displaying the information relating to the at least one person sequentially acquired in a second display area, the second display area being different from the first display area.

9. The display control method of claim 8, wherein the person part to be displayed in the first display area is designated according to a manipulation of the user for designating at least a part of the moving picture displayed in the first display area.

10. The display control method of claim 8, wherein, in the case that a plurality of persons are specified in the designated person part, acquiring information comprises acquiring information relating to each of the plurality of persons, and
   performing control for displaying the acquired information comprises performing control for displaying the acquired information relating to each of the plurality of persons distinguishably from each other in the second display area.

11. The display control method of claim 10, further comprising:
   designating the information relating to one or more persons among the information relating to each of the plurality of persons displayed distinguishably from each other in the second display area;
   specifying the one or more persons corresponding to the designated information; and
   performing control for displaying an image in which only the specified one or more persons are included in the first display area.

12. The display control method of claim 8, wherein, in the case that a plurality of persons are specified in the designated person part, acquiring information comprises acquiring information relating to each of the plurality of persons, and the display control method further comprises:

performing processing to integrate the information relating to each of the plurality of persons as one piece of information; and performing control for displaying the one piece of integrated information in the second display area.

13. A display control method, comprising:

performing control for displaying at least a part of an original image in a first display area, one or more persons being included in the at least a part of the original image, designating a person part of the original image to be displayed in the first display area, the person part including at least one person therein, according to a manipulation of a user for changing a part of the original image displayed in the first display area, specifying the at least one person included in the designated person part, acquiring information relating to the specified at least one person, and performing control for displaying the acquired information relating to the at least one person in a second display area of the display unit, the second display area being different from the first display area.

14. The display control method of claim 13, wherein the person part to be displayed in the first display area is designated according to a manipulation of the user for changing the size or the position of the part of the original image displayed in the first display area.

15. A non-transitory computer-readable recording medium for recording a program readable by a computer, the program controlling the computer to execute functions of:

performing control for displaying a moving picture in which one or more persons are included, in a first display area;

designating a person part of the moving picture to be displayed in the first display area, the person part including at least one person therein, according to a manipulation performed by a user in relation to the first display area for designating the at least one person;

sequentially specifying the at least one person included in the designated person part of the moving picture;

sequentially acquiring information relating to the at least one person sequentially acquired; and performing control for sequentially displaying the information relating to the at least one person sequentially acquired in a second display area, the second display area being different from the first display area.

16. A display control apparatus comprising:

a processor that is configured to:

perform control for displaying an image in which a plurality of persons are included, in a first display area of a display unit;

perform first information display control for displaying information relating to each of the plurality of persons distinguishably from each other in a second display area which is provided in the display unit separately from the first display area;

designate a person part of the image to be displayed in the first display area, the person part including at least one person of the plurality of persons therein, according to a manipulation performed by a user in relation to the first display area for designating the at least one person;

specify the at least one person included in the designated person part of the image; and perform second information display control for displaying only information relating to the specified at least one person among the information relating to each of the plurality of persons in the second display area, instead of the first information display control.

* * * * *